(12) United States Patent
Weng et al.

(10) Patent No.: US 10,900,775 B2
(45) Date of Patent: Jan. 26, 2021

(54) MODELING SYSTEM

(71) Applicant: TDK TAIWAN CORP., Taoyuan (TW)

(72) Inventors: Chih-Wei Weng, Taoyuan (TW);
Chao-Chang Hu, Taoyuan (TW);
Mao-Kuo Hsu, Taoyuan (TW);
Sin-Jhong Song, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 0 days.

(21) Appl. No.: 16/549,825

(22) Filed: Aug. 23, 2019

(65) Prior Publication Data

US 2020/0064124 A1    Feb. 27, 2020

Related U.S. Application Data

(60) Provisional application No. 62/722,353, filed on Aug. 24, 2018.

(30) Foreign Application Priority Data

Jul. 24, 2019   (CN) .......................... 2019 1 0670121

(51) Int. Cl.
*G01B 11/245* (2006.01)
*G02B 27/00* (2006.01)
(Continued)

(52) U.S. Cl.
CPC .......... *G01B 11/245* (2013.01); *G02B 26/023* (2013.01); *G02B 26/085* (2013.01); *G02B 26/101* (2013.01); *G02B 27/005* (2013.01)

(58) Field of Classification Search
CPC ............ G02B 27/0172; G02B 21/0032; G02B 27/0179; G02B 21/0076;
(Continued)

(56) References Cited

U.S. PATENT DOCUMENTS

| | | | |
|---|---|---|---|
| 6,188,514 B1* | 2/2001 | Saito ................. | G02B 21/0052 359/234 |
| 2010/0188742 A1* | 7/2010 | Chen ................. | G02B 21/0064 359/385 |

(Continued)

*Primary Examiner* — Michael P Stafira
(74) *Attorney, Agent, or Firm* — Muncy, Geissler, Olds & Lowe, P.C.

(57) ABSTRACT

A modeling system is provided, including a light-emitting source, a chromatic aberration member, and a receiving module. The light-emitting source can emit a mixed light, including a main light having a first wavelength and a sub-light having a second wavelength. The main light and the sub-light are emitted along an emission path and toward an object, and they are reflected by the object after reaching it. The chromatic aberration member is disposed on the emission path. The receiving module includes a main body, a receiving member, a space filtering member, and a first driving assembly. The receiving member is disposed on the main body. After being reflected, the main light and the sub-light move along a reflecting path and reach the receiving member. The space filtering member is disposed on the reflecting path. The first driving assembly can drive the space filtering member to move.

16 Claims, 6 Drawing Sheets

(51) Int. Cl.
*G02B 26/02* (2006.01)
*G02B 26/10* (2006.01)
*G02B 26/08* (2006.01)

(58) Field of Classification Search
CPC ...... G02B 2027/0138; G02B 2027/014; G02B
21/02; G02B 21/16; G02B 21/367; G02B
2027/0185; G02B 21/361; G02B 27/0025;
G02B 21/0064; G02B 21/0072; G02B
21/008; G02B 21/00; G02B 21/0048;
G02B 21/0056; G02B 21/006; G02B
5/3083; G02B 1/002; G02B 21/0024;
G02B 21/06; G02B 21/33; G02B 21/365;
G02B 27/0093; G02B 13/22; G02B
21/0016; G02B 21/002; G02B 27/0075;
G02B 27/017; G02B 27/141; G02B 3/08;
G02B 5/3016; G02B 13/006; G02B 1/00;
G02B 1/08; G02B 2027/0105; G02B
2027/0174; G02B 2027/0178; G02B
2027/0187; G02B 21/0044; G02B 21/26;
G02B 21/34; G02B 21/36; G02B
26/0833; G02B 26/0875; G02B 26/10;
G02B 26/101; G02B 26/105; G02B
27/0037; G02B 27/0068; G02B 27/0081;
G02B 27/0927; G02B 27/1006; G02B
27/1013; G02B 27/126; G02B 27/283;
G02B 27/30; G02B 27/48; G02B 27/58;
G02B 5/1876; G02B 6/32; G02B 7/10;
G02B 9/64; G02B 13/00; G02B 13/0015;
G02B 13/0095; G02B 17/002; G02B
17/06; G02B 17/061; G02B 17/0808;
G02B 17/086; G02B 1/02; G02B 1/04;
G02B 1/043; G02B 1/11; G02B
2003/0093; G02B 2006/12102; G02B
2027/0112; G02B 2027/0125; G02B
21/0004; G02B 21/0036; G02B 21/004;
G02B 21/0052; G02B 21/0068; G02B
21/0084; G02B 21/0088; G02B 21/0096;
G02B 21/025; G02B 21/04; G02B 21/08;
G02B 21/086; G02B 21/14; G02B
21/245; G02B 21/32; G02B 2207/101;
G02B 2207/114; G02B 23/04; G02B
23/243; G02B 23/2453; G02B 23/2469;
G02B 23/2476; G02B 26/06; G02B
26/0808; G02B 27/0012; G02B 27/0031;
G02B 27/005; G02B 27/0176; G02B
27/09; G02B 27/0911; G02B 27/0961;
G02B 27/1066; G02B 27/14; G02B
27/144; G02B 27/4211; G02B 3/00;
G02B 3/0056; G02B 3/0081; G02B 3/02;
G02B 3/10; G02B 3/14; G02B 5/00;
G02B 5/005; G02B 5/008; G02B 5/0226;
G02B 5/0268; G02B 5/0808; G02B 5/18;
G02B 5/1828; G02B 5/1847; G02B 5/30;
G02B 5/3025; G02B 6/0076; G02B
6/009; G02B 6/02042; G02B 6/06; G02B
7/021; G02B 7/38; G02B 9/14; G02B
9/34; G02B 9/60

See application file for complete search history.

(56) References Cited

U.S. PATENT DOCUMENTS

| | | | |
|---|---|---|---|
| 2010/0296106 A1* | 11/2010 | Gates | G02B 21/0064 356/614 |
| 2012/0041839 A1* | 2/2012 | Weiss | A63H 17/002 705/26.5 |
| 2015/0054937 A1* | 2/2015 | Lippert | G02B 21/0032 348/80 |
| 2015/0055215 A1* | 2/2015 | Chen | G02B 21/0064 359/386 |
| 2017/0074644 A1* | 3/2017 | Arieli | G01B 11/25 |
| 2017/0293127 A1* | 10/2017 | Sinha | G02B 21/0064 |

* cited by examiner

FIG. 6

MODELING SYSTEM

CROSS REFERENCE TO RELATED APPLICATIONS

This application claims the benefit of U.S. Provisional Application No. 62/722,353, filed Aug. 24, 2018, and China Patent Application No. 201910670121.X, filed Jul. 24, 2019, the entirety of which are incorporated by reference herein.

BACKGROUND OF THE INVENTION

Field of the Invention

The application relates in general to a modeling system, and in particular, to a modeling system having a chromatic aberration member.

Description of the Related Art 3D modeling is the process of calculating and developing a profile of a surface of an object, and is used in a wide variety of fields. For example, 3D modeling can be used in films, games, 3D models, and virtual reality. However, recent devices used for scanning and modeling a real object are usually complex and expensive. Therefore, how to address the aforementioned problem has become an important issue.

BRIEF SUMMARY OF INVENTION

To address the deficiencies of conventional products, an embodiment of the invention provides a modeling system, including a light-emitting source, a chromatic aberration member, and a receiving module. The light-emitting source can emit a mixed light, including a main light having a first wavelength and a sub-light having a second wavelength. The main light and the sub-light are emitted along an emission path and toward an object, and they are reflected by the object after reaching it. The chromatic aberration member is disposed on the emission path. The receiving module includes a main body, a receiving member, a space filtering member, and a first driving assembly. The receiving member is disposed on the main body. After being reflected, the main light and the sub-light move along a reflecting path and reach the receiving member. The space filtering member is movably connected to the main body and disposed on the reflecting path. The first driving assembly can drive the space filtering member to move relative to the main body.

In some embodiments, the receiving module further comprises a second driving assembly. The first driving assembly drives the space filtering member to move in a first direction relative to the main body, and the second driving assembly drives the space filtering member to move in a second direction relative to the main body, wherein the first direction is different from the second direction. In some embodiments, the first driving assembly can drive the space filtering member to rotate relative to the main body.

In some embodiments, the modeling system further comprises a switchable filter member, disposed on the emission path or the reflecting path. The modeling system further comprises a light path control module configured to change the moving direction of the reflecting path. The switchable filter member can be disposed between the chromatic aberration member and the light path control module, between the light-emitting source and the light path control module, or between the light path control module and the space filtering member.

In some embodiments, the modeling system further comprises a chromatic aberration member driving assembly, configured to drive the chromatic aberration member to move relative to the light-emitting source. The modeling system further comprises a control member and an inertia detecting member. The control member is electrically connected to the first driving assembly. The inertia detecting member is configured to detect the gravity state of the modeling system. The inertia detecting member is electrically connected to the control member.

In some embodiments, the mixed light further comprises an additional sub-light having a third wavelength. The first wavelength is between the second wavelength and the third wavelength.

In some embodiments, the modeling system further comprises a receiving member driving assembly configured to drive the receiving member to move relative to the main body.

An embodiment of the invention further provides a modeling method, including providing the aforementioned modeling system; using the first driving assembly to adjust the position of the space filtering member, and positioning the space filtering member at the focal point of the main light; using the receiving member to receive the reflected main light; using the receiving member to receive the reflected sub-light; and comparing the main light to calculate the profile of the object.

In some embodiments, the modeling method further comprises using the first driving assembly to move the space filtering member based on the data detected by the inertia detecting member.

In some embodiments, the receiving member simultaneously receives the main light and the sub-light.

In some embodiments, the modeling method further comprises using the receiving member to receive the reflected additional sub-light; and comparing the main light and the additional sub-light to calculate the profile of the object.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the modeling system and the modeling method are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
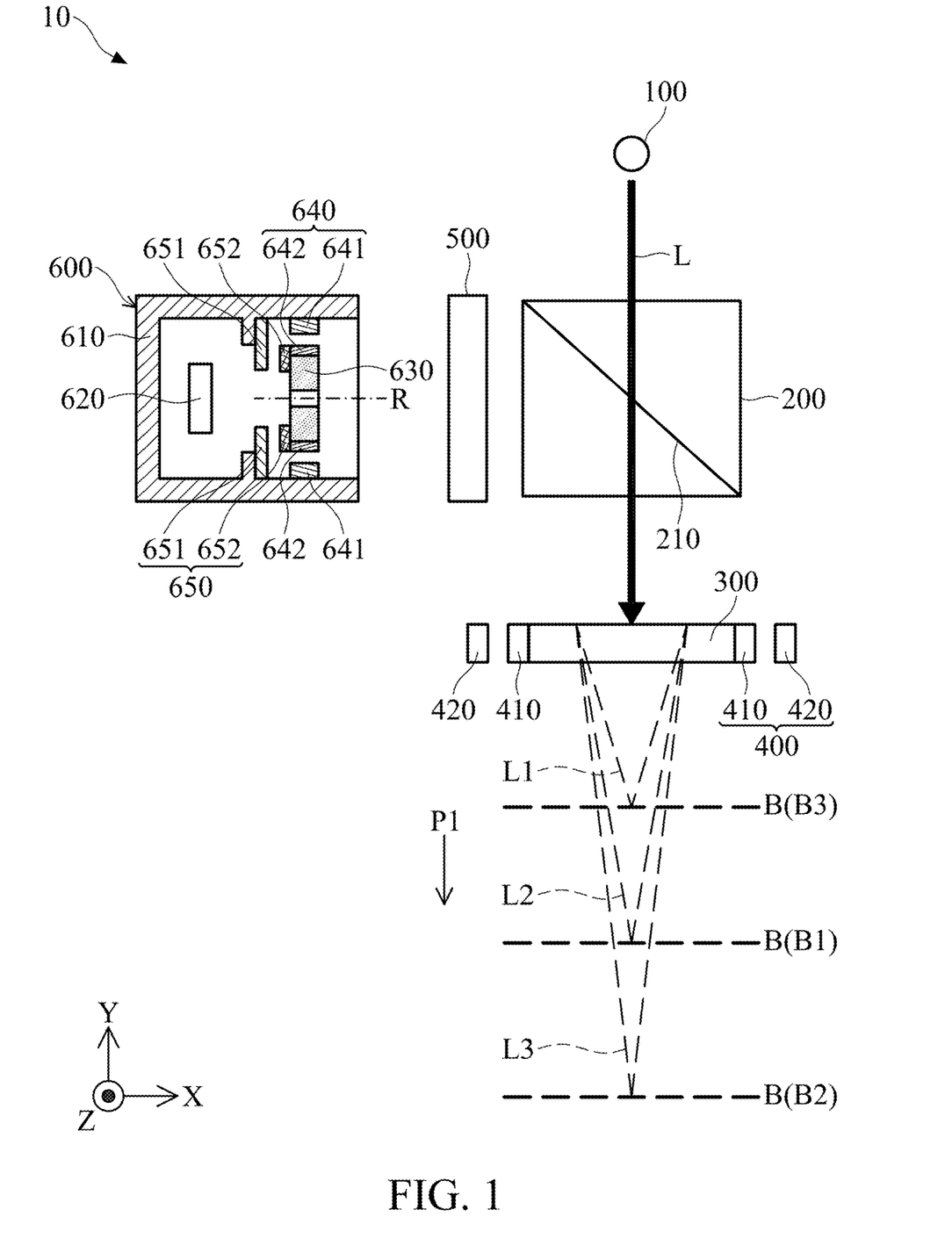
FIG. 1 is a schematic diagram of a modeling system according to an embodiment of the invention, wherein a mixed light from the light-emitting source moves along an emission path.

Referring to FIG. 1, in an embodiment of the invention, the modeling system 10 primarily includes a light-emitting source 100, a light path control module 200, a chromatic aberration member 300, a chromatic aberration member driving assembly 400, a switchable filter member 500, and a receiving module 600.

The light-emitting source 100 emits a mixed light L. The mixed light L includes a main light L1 having a first wavelength, a sub-light L2 having a second wavelength, and another sub-light L3 having a third wavelength. For example, the mixed light L can be a white light, and the main light L1, the sub-light L2 and the sub-light L3 can be a green light with 550 nm wavelength, a red light with 650 nm wavelength and a blue light with 400 nm wavelength respectively. The mixed light L can include more lights with different wavelengths, in some embodiments, the mixed light L includes 420-600 lights with different wavelengths.

The light path control module 200 is disposed between the light-emitting source 100 and the chromatic aberration member 300. When the user uses the modeling system 10 to obtain a profile of an object B, the chromatic aberration member 300 is disposed between the light-emitting source 100 and the object B.

The light path control module 200 can be a semi-reflecting mirror, and the reflecting surface 210 of the light path control module 200 faces the chromatic aberration member 300. Therefore, the mixed light L from the light-emitting source 100 can directly pass the light path control module 200 along an emission path P1 and reach the chromatic aberration member 300. When the mixed light L passes through the chromatic aberration member 300, the main light L1, the sub-light L2, and the sub-light L3 respectively focuses on different planes due to the different wavelengths. Thus, when the mixed light L moves along the emission path P1 toward the object B, only the surfaces at the distances corresponding to the focal lengths of each lights (the main light L1, the sub-light L2, and the sub-light L3) can completely reflect back each lights. In other words, the strength of the reflected light is substantially the same as the strength of light before it is reflected.

For example, the main light L1, the sub-light L2, and the sub-light L3 can respectively focus on surfaces B1, B2 and B3 of the object B after passing through the chromatic aberration member 300. Thus, the main light L1 is completely reflected by the surface B1, and the sub-light L2 and the sub-light L3 are not reflected by the surface B1 or are not completely reflected by the surface B1. Similarly, the sub-light L2 is completely reflected by the surface B2, and the main light L1 and the sub-light L3 are not reflected by the surface B2 or are not completely reflected by the surface B2; the sub-light L3 is completely reflected by the surface B3, and the main light L1 and the sub-light L2 are not reflected by the surface B3 or are not completely reflected by the surface B3.

The chromatic aberration member driving assembly 400 is connected to the chromatic aberration member 300, so as to drive the chromatic aberration member 300 to move along the X-axis and/or the Y-axis, and the focusing position of the main light L1, the sub-light L2, and the sub-light L3 can be adjusted.

In this embodiment, the chromatic aberration member driving assembly 400 includes at least one electromagnetic driving member 410 and at least one electromagnetic driving member 420. The electromagnetic driving member 410 is disposed on the chromatic aberration member 300, and the electromagnetic driving member 420 is fixed relative to the light-emitting source 100. The electromagnetic driving member 410 can be a coil, and the electromagnetic driving member 420 can include a magnetic member (such as a magnet). Therefore, when current flows through the coil (the electromagnetic driving member 410), the electromagnetic effect generated between the coil and the magnetic member can drive the chromatic aberration member 300 to move relative to the light-emitting source 100. In some embodiments, the electromagnetic driving member 410 can be a magnetic member, and the electromagnetic driving member 420 can be a coil.

Figure 2:
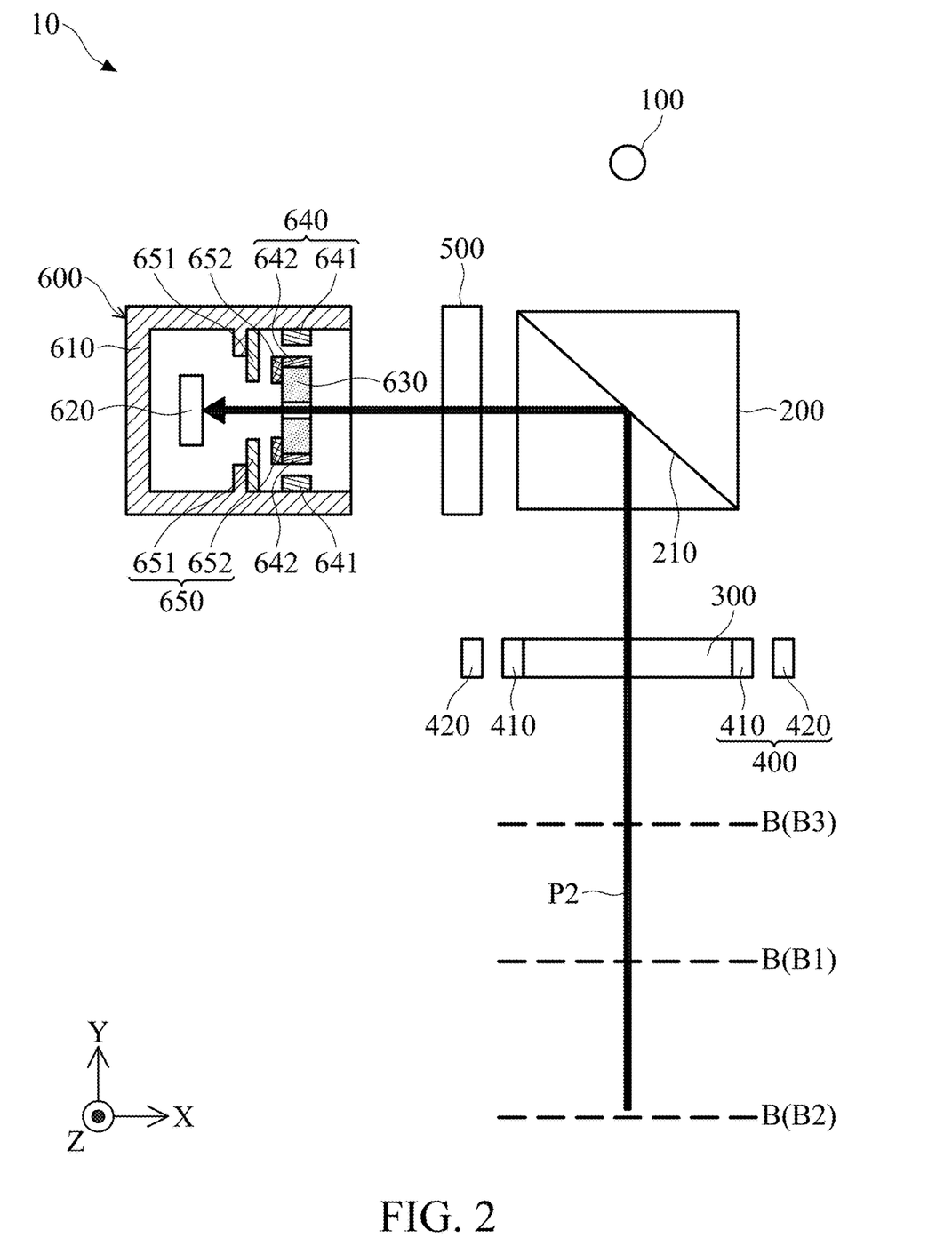
FIG. 2 is a schematic diagram of the modeling system according to an embodiment of the invention, wherein the reflected light moves along a reflecting path.

Referring to FIG. 2, after being reflected, the main light L1, the sub-light L2, and the sub-light L3 moves along a reflecting path P2 to the receiving module 600. During the movement, the main light L1, the sub-light L2, and the sub-light L3 pass through the chromatic aberration member 300 again, and then they are reflected by the reflecting surface 210 of the light path control module 200 and pass through the switchable filter member 500 to the receiving module 600.

The switchable filter member 500 includes a plurality of optical filters which can be switched used. Therefore, when the main light L1, the sub-light L2, and the sub-light L3 pass through the switchable filter member 500, only one light with a single wavelength will remained (the main light L1, the sub-light L2 or the sub-light L3). Furthermore, since the switchable filter member 500 can rapidly change different filters, the different lights can enters the receiving module 600 in a short time.

Figure 3:
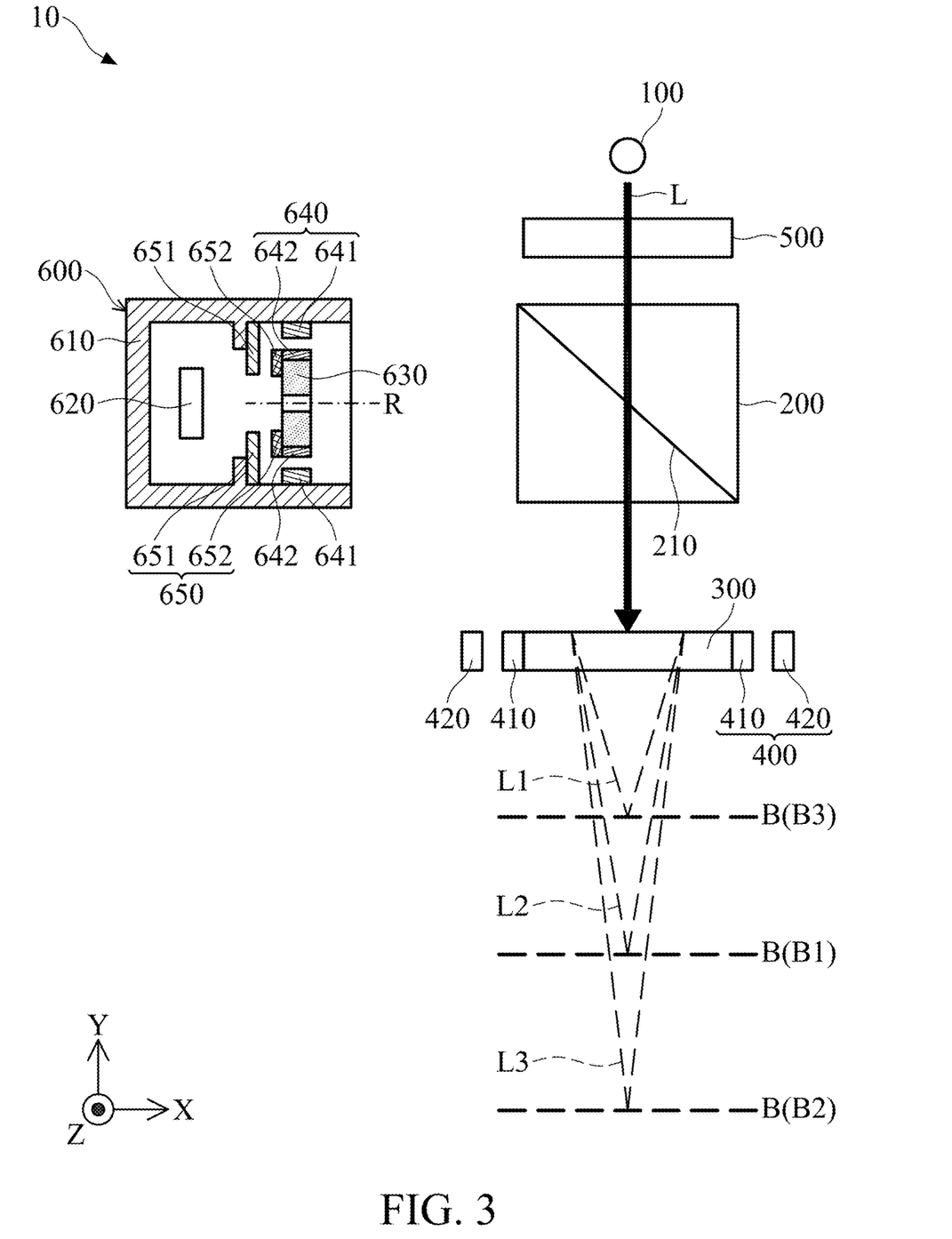
FIG. 3 is a schematic diagram of a modeling system according to another embodiment of the invention.
Figure 4:
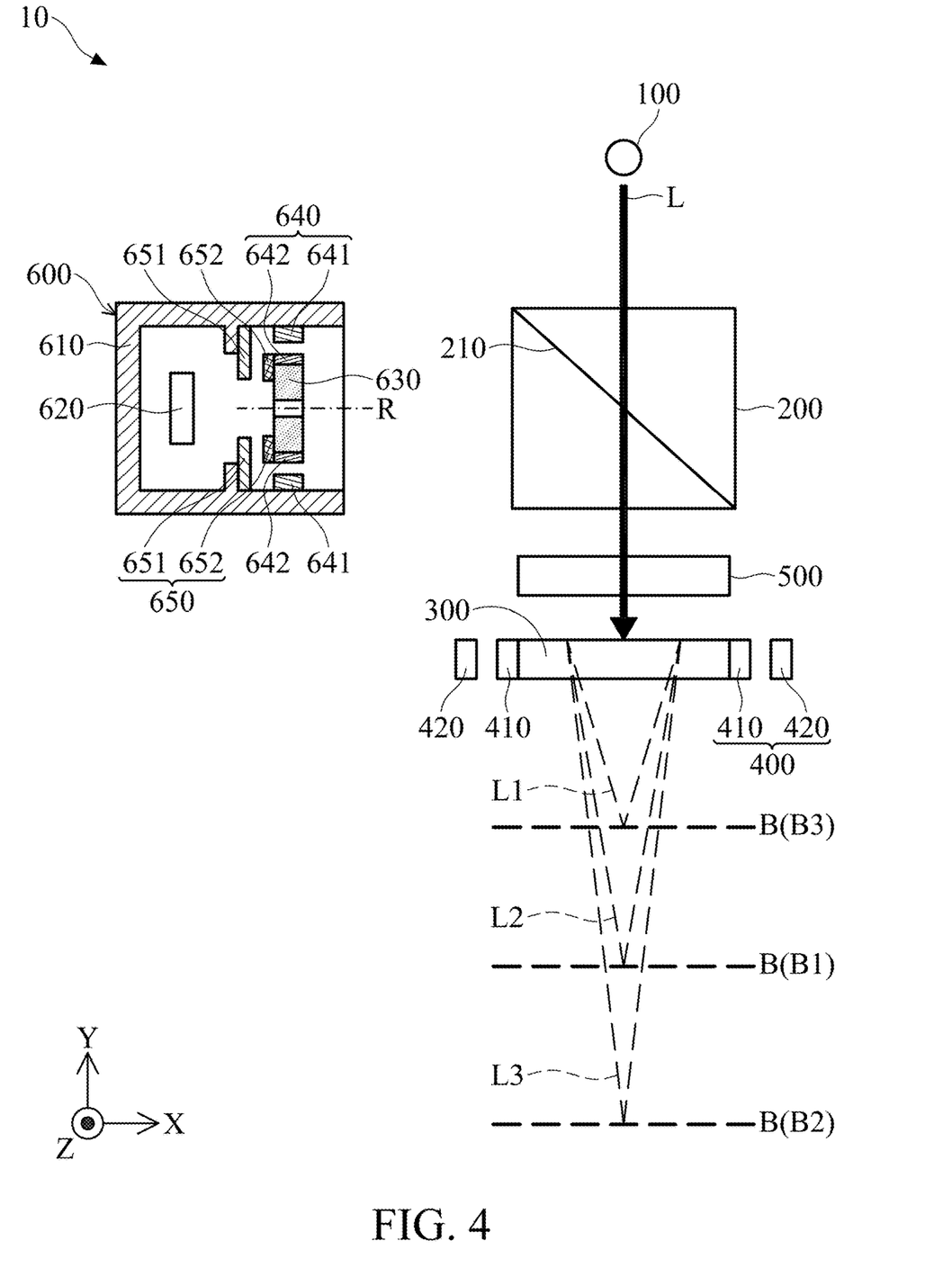
FIG. 4 is a schematic diagram of a modeling system according to another embodiment of the invention.

As shown in FIGS. 3 and 4, in some embodiments, the position of the switchable filter member 500 can be adjusted as required. For example, the switchable filter member 500 can be disposed between the light-emitting source 100 and the light path control module 200 (FIG. 3), or between the light path control module 200 and the chromatic aberration member 300 (FIG. 4). In some embodiments, the modeling system 10 can include a plurality of switchable filter members 500.

Referring to FIG. 2, the receiving module 600 includes a main body 610, a receiving member 620, a spatial filtering member 630, a first driving assembly 640, and a second driving assembly 650. The main body 610 can be a box, wherein the box only has one opening facing the light path control module 200 to allow the main light L1, the sub-light L2, and the sub-light L3 entering. The receiving member 620 and the spatial filtering member 630 are disposed in the box. The receiving member 620 is configured to receive the main light L1, the sub-light L2, and the sub-light L3, and the spatial filtering member 630 is disposed between the light path control module 200 and the receiving member 620.

The receiving member 620 includes an image sensor, and the spatial filtering member 630 is a pinhole. When the main light L1, the sub-light L2 or the sub-light L3 passes through the spatial filtering member 630, the high-frequency noise in the light can be filtered, and the receiving member 620 can obtain clear signal data after receiving the light.

It should be noted that the spatial filtering member 630 is disposed on the focal point of the main light L1, the sub-light L2, and the sub-light L3 after being reflected by the reflecting surface 210. The first driving assembly 640 and the second driving assembly 650 are connected to the main body 610 and the spatial filtering member 630, so as to provide a driving force to move the spatial filtering member 630 relative to the main body 610.

In this embodiment, the first driving assembly 640 includes at least one electromagnetic driving member 641 and at least one electromagnetic driving member 642 corresponding to each other. The electromagnetic driving member 641 and the electromagnetic driving member 642 are respectively disposed on the main body 610 and the spatial filtering member 630. The electromagnetic driving member 641 can be a magnetic member (such as a magnet), and the electromagnetic driving member 642 can be a coil. When current flows through the electromagnetic driving member 641, the electromagnetic effect generated between the electromagnetic driving member 641 and the electromagnetic driving member 642 can provide a driving force to drive the spatial filtering member 630 to move relative to the main body 610 along the X-axis (the first direction). In some embodiments, the electromagnetic driving member 641 can be a coil, and the electromagnetic driving member 642 can be a magnetic member.

The second driving assembly 650 includes at least one electromagnetic driving member 651 and at least one electromagnetic driving member 652 corresponding to each other. The electromagnetic driving member 651 and the electromagnetic driving member 652 are respectively disposed on the main body 610 and the spatial filtering member 630. The electromagnetic driving member 651 can be a magnetic member (such as a magnet), and the electromagnetic driving member 652 can be a coil. When current flows through the electromagnetic driving member 651, the electromagnetic effect generated between the electromagnetic driving member 651 and the electromagnetic driving member 652 can provide a driving force to drive the spatial filtering member 630 to move relative to the main body 610 along the Y-axis and/or the Z-axis (the second direction). In some embodiments, the electromagnetic driving member 651 can be a coil, and the electromagnetic driving member 652 can be a magnetic member.

In some embodiments, the first driving assembly 640 includes at least two electromagnetic driving members 641 and at least two electromagnetic driving members 642. The at least two electromagnetic driving members 642 are disposed on the opposite sides of the spatial filtering member 630, and the electromagnetic driving members 641 are correspondingly disposed on the main body 610. When currents with different strengths are respectively applied to the electromagnetic driving members 642 (or the electromagnetic driving members 641) disposed on the opposite sides, different driving forces can be generated on the opposite sides of the spatial filtering member 630, and the spatial filtering member 630 can be driven to rotate around a rotation axis R.

After passing the spatial filtering member 630, the main light L1, the sub-light L2, and the sub-light L3 can be received by the receiving member 620, and the receiving member 620 can calculate the profile of the object B according to the received signal data.

The modeling method using the aforementioned modeling system 10 is discussed below. Referring to the aforementioned figures, first, the user can provide any one of the modeling system 10 in FIG. 1, FIG. 3, or FIG. 4, and the light-emitting source 100 can emit the mixed light L to the object B.

After the mixed light L passes through the chromatic aberration member 300, it will be split to the main light L1, the sub-light L2, and the sub-light L3. After the main light L1, the sub-light L2, and the sub-light L3 contact the surfaces of the object B, they will be reflected. The reflected main light L1, the reflected sub-light L2, and the reflected sub-light L3 are reflected to the receiving module 600 by the reflecting surface 210 of the light path control module 200.

At this time, the user can uses the first driving assembly 640 and the second driving assembly 650 to adjust the position of the spatial filtering member 630, so as to position the spatial filtering member 630 at the focal point of the main light L1 (this position is usually also the focal point of the sub-light L2 and the focal point of the sub-light L3). Sequentially, the receiving member 620 can receive the main light L1, the sub-light L2, and the sub-light L3.

In this embodiment, the switchable filter member 500 can rapidly change the different filters, such that the receiving member 620 can receive the main light L1, the sub-light L2, and the sub-light L3 in sequence in a short time. In some embodiments, the receiving member 620 can receive lights with different wavelengths simultaneously. Therefore, the switchable filter member 500 can be omitted, and the receiving member 620 simultaneously receives the main light L1, the sub-light L2, and the sub-light L3.

Finally, the receiving member 620 can calculate the profile of the object B by comparing the main light L1, the sub-light L2, and the sub-light L3. In detail, the receiving member 620 can constitute an initial plane according to the signal data of the main light L1, and calculate the profile of the object B according to the distance between the focal points of the main light L1 and the sub-light L2, the distance between the focal points of the main light L1 and the sub-light L3, and the signal data of the sub-light L2 and the sub-light L3.

Figure 5:
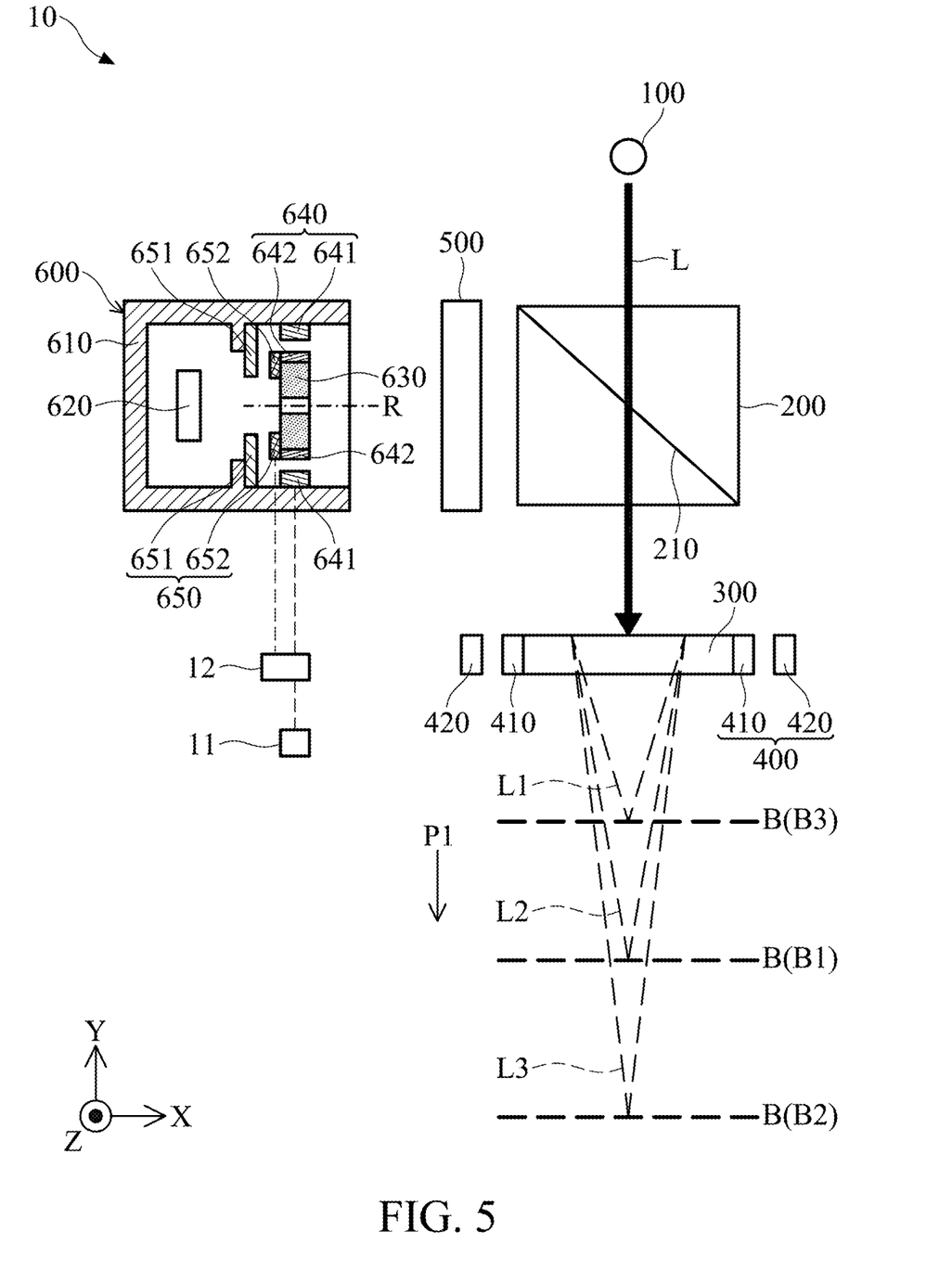
FIG. 5 is a schematic diagram of a modeling system according to some embodiments of the invention.

In some embodiments, the modeling system 10 can further include an inertia detecting member 11 and a control member 12, wherein the inertia detecting member 11 is configured to detect the gravity state of the modeling system 10, and the control member 12 is electrically connected to the inertia detecting member 11 and the first and second driving assembly 640 and 650. The control member 12 can control the first driving assembly 640 and the second driving assembly 650 to drive the spatial filtering member 630 to move in response to the detected gravity state.

Figure 6:
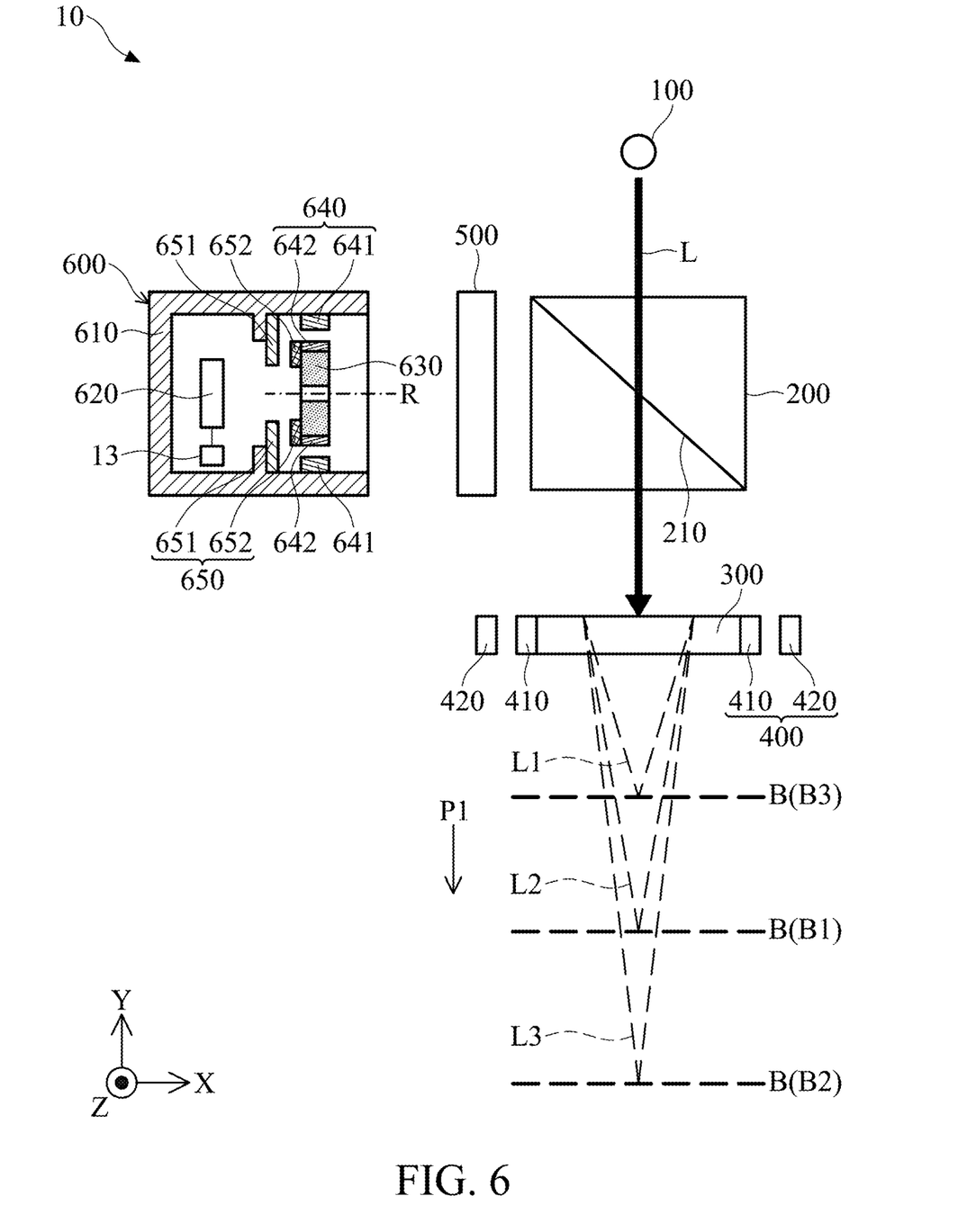
FIG. 6 is a schematic diagram of a modeling system according to some embodiments of the invention.

In some embodiments, the modeling system 10 can further includes a receiving member driving assembly 13, wherein the receiving member driving assembly 13 is connected to the receiving member 620, and configured to drive the receiving member 620 to move relative to the main body 610.

In summary, a modeling system is provided, including a light-emitting source, a chromatic aberration member, and a receiving module. The light-emitting source can emit a mixed light, including a main light having a first wavelength and a sub-light having a second wavelength. The main light and the sub-light are emitted along an emission path and toward an object, and they are reflected by the object after they reach it. The chromatic aberration member is disposed on the emission path. The receiving module includes a main body, a receiving member, a space filtering member, and a first driving assembly. The receiving member is disposed on the main body. After being reflected, the main light and the sub-light move along a reflecting path and reach the receiving member. The space filtering member is movably connected to the main body and disposed on the reflecting path. The first driving assembly can drive the space filtering member to move relative to the main body.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A modeling system, comprising:
    a light-emitting source, configured to emit a mixed light, wherein the mixed light comprises a main light having a first wavelength and a sub-light having a second wavelength, the main light and the sub-light are emitted along an emission path and toward an object, and the main light and the sub-light are reflected by the object after reaching the object;
    a chromatic aberration member, disposed on the emission path; and
    a receiving module, comprising:
        a main body;
        a receiving member, configured to receive the main light and the sub-light to output a signal, wherein the receiving member is disposed on the main body, and the main light and the sub-light move along a reflecting path and reach the receiving member after being reflected;
        a spatial filtering member, configured to filter a noise of the main light or the sub-light, wherein the spatial filtering member is movably connected to the main body, and disposed on the reflecting path; and
        a first driving assembly, configured to drive the spatial filtering member to move relative to the main body in a predetermined range, so that a deviated main light or a deviated sub-light can reach the receiving member in a proper state;
        wherein in the predetermined range, the spatial filtering member does not completely cover a light path of the main light or the sub-light to the receiving member.

2. The modeling system as claimed in claim 1, wherein the receiving module further comprises a second driving assembly, the first driving assembly drives the spatial filtering member to move in a first direction relative to the main body, and the second driving assembly drives the spatial filtering member to move in a second direction relative to the main body, wherein the first direction is different from the second direction.

3. The modeling system as claimed in claim 1, wherein the first driving assembly drives the spatial filtering member to rotate relative to the main body.

4. The modeling system as claimed in claim 1, wherein the modeling system further comprises a switchable filter member, disposed on the emission path or the reflecting path.

5. The modeling system as claimed in claim 4, wherein the modeling system further comprises a light path control module configured to change a moving direction of the reflecting path, and the switchable filter member is disposed between the chromatic aberration member and the light path control module.

6. The modeling system as claimed in claim 4, wherein the modeling system further comprises a light path control module configured to change a moving direction of the reflecting path, and the switchable filter member is disposed between the light-emitting source and the light path control module.

7. The modeling system as claimed in claim 4, wherein the modeling system further comprises a light path control module configured to change moving direction of the reflecting path, and the switchable filter member is disposed between the light path control module and the spatial filtering member.

8. The modeling system as claimed in claim 1, wherein the modeling system further comprises a chromatic aberration member driving assembly, configured to drive the chromatic aberration member to move relative to the light-emitting source.

9. The modeling system as claimed in claim 1, wherein the modeling system further comprises a control member, electrically connected to the first driving assembly.

10. The modeling system as claimed in claim 9, wherein the modeling system further comprises an inertia detecting member configured to detect a gravity state of the modeling system, and the inertia detecting member is electrically connected to the control member.

11. The modeling system as claimed in claim 1, wherein the mixed light further comprises an additional sub-light having a third wavelength, and the first wavelength is between the second wavelength and the third wavelength.

12. The modeling system as claimed in claim 1, wherein the modeling system further comprises a receiving member driving assembly, configured to drive the receiving member to move relative to the main body.

13. A modeling method, comprising:
    providing a modeling system, comprising:
        a light-emitting source, configured to emit a mixed light, wherein the mixed light comprises a main light having a first wavelength and a sub-light having a second wavelength, the main light and the sub-light are emitted along an emission path and toward an object, and the main light and the sub-light are reflected by the object after reaching the object;

a chromatic aberration member, disposed on the emission path; and a receiving module, comprising:
   a main body;
   a receiving member, configured to receive the main light and the sub-light to output a signal, wherein the receiving member is disposed on the main body, and the main light and the sub-light move along a reflecting path and reach the receiving member after being reflected;
   a spatial filtering member, configured to filter noise of the main light or the sub-light, wherein the spatial filtering member is movably connected to the main body, and disposed on the reflecting path; and
   a first driving assembly, configured to drive the spatial filtering member to move relative to the main body in a predetermined range, so that a deviated main light or deviated sub-light can reach the receiving member in a proper state, wherein in the predetermined range, the spatial filtering member does not completely cover a light path of the main light or the sub-light to the receiving member;

using the first driving assembly to adjust a position of the spatial filtering member, and positioning the spatial filtering member at focal point of the main light;

using the receiving member to receive the reflected main light;

using the receiving member to receive the reflected sub-light; and calculating a profile of the object by comparing the main light and the sub-light.

14. The modeling method as claimed in claim 13, wherein the modeling method further comprises providing an inertia detecting member; and using the first driving assembly to move the based on data detected by the inertia detecting member.

15. The modeling method as claimed in claim 13, wherein the receiving member simultaneously receives the main light and the sub-light.

16. The modeling method as claimed in claim 15, wherein the mixed light further comprises an additional sub-light having a third wavelength, and the first wavelength is between the second wavelength and the third wavelength, wherein the modeling method further comprises:
   using the receiving member to receive the reflected additional sub-light; and
   comparing the main light, the sub-light, and the additional sub-light to calculate the profile of the object.

* * * * *